July 4, 1950     H. L. GORDON     2,513,860
ANTIFRICTION ROLLING BEARING
Filed Aug. 8, 1949
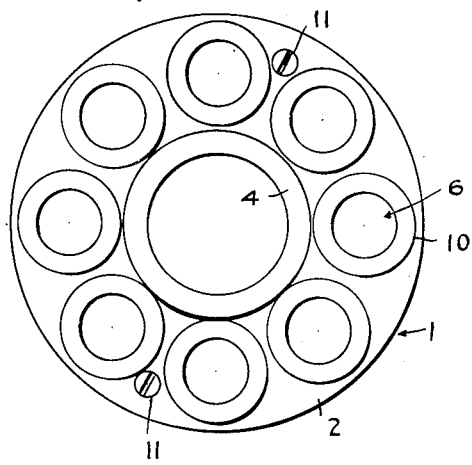
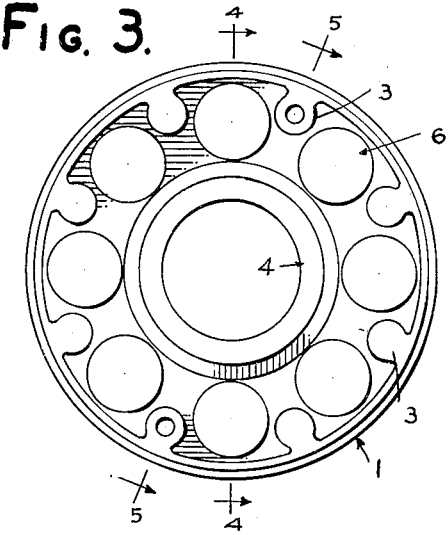
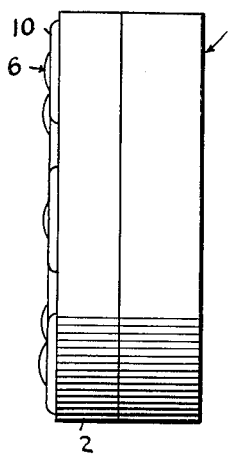
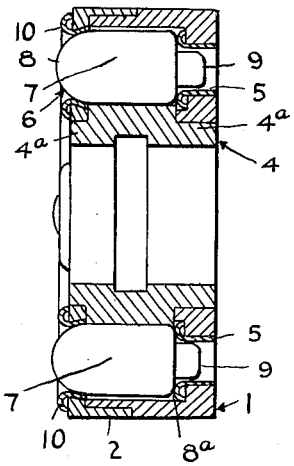
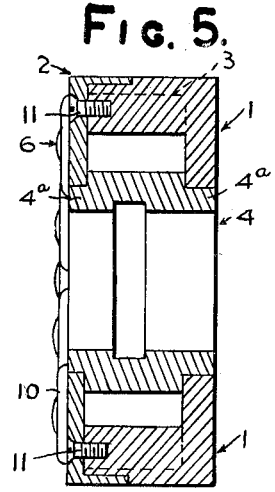
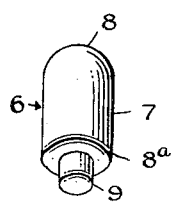
INVENTOR,
HARRY L. GORDON
BY
E. E. Vrooman & Co.
attys.

Patented July 4, 1950

2,513,860

UNITED STATES PATENT OFFICE 2,513,860

ANTIFRICTION ROLLER BEARING

Harry L. Gordon, Sunland, Calif.

Application August 8, 1949, Serial No. 109,087

3 Claims. (Cl. 308—203)

This invention relates to an antifriction roller bearing.

An object of the invention is the production of a unitary device which is comparatively inexpensive to construct, and is highly efficient in operation.

Another object of the invention is the construction of an antifriction roller bearing device that can be used in connection with shafts, particularly airplane shafts, in which device is susceptible of repairs with comparative ease when any part thereof is worn or needs repairing.

A still further object of the invention is the construction of a novel device in which there are roller bearings which in operation spin like a top; further, these roller bearings operate quietly; they can be easily positioned in the assembly and can be quickly removed when desired.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 1 is a view in side elevation of a device constructed in accordance with the present invention.

Fig. 2 is a top plan view of the device.

Fig. 3 is a top plan view of the device with the auxiliary section removed.

Fig. 4 is a vertical sectional view taken on line 4—4, Fig. 3, looking in the direction of the arrows.

Fig. 5 is a vertical sectional view, taken on line 5—5, Fig. 4, and looking in the direction of the arrows.

Fig. 6 is a perspective view of one of the rollers.

Referring to the drawings, in which the preferred embodiment of this invention is illustrated, I designates the primary section of the device, and 2 is the cap or auxiliary section. These sections I and 2 can be made of any suitable material. In section I and integral therewith are a plurality of cylindrical posts 3. An annular shaft sleeve 4 is positioned in the central part of primary section I. In the bottom of section I are primary cup seats each formed between two contiguous posts 3.

Seated in each primary cup seat is a roller 6. This roller 6 has a cylindrical body 7 that is provided with a rounded dome end or top 8, and on its inner end is a depending round tit 9. This tit 9 extends into the primary cup seat 5.

The cap or auxiliary section 2 is provided with a plurality of auxiliary cup seats 10 into which extends the dome top 8 of the cylindrical roller 6.

The auxiliary section 2 fits upon the primary section I and is held against accidental displacement by screws II; these screws II extended into two of the cylindrical posts 3, these posts 3 having screw threaded sockets for the screws II.

The cylindrical posts 3 assist in spacing the rollers and by reason of the rollers being supported at their ends in the novel cups, the rollers operate in an excellent manner, permitting free rotation of the sleeve 4. It is to be noted that sleeve 4 has reduced annular portions 4ª at its ends, Fig. 5, which extend into portions of the sections I and 2.

Each roller 6, for excellent operation, is rounded or bevelled at 8ª.

The present invention is a decided improvement over the invention disclosed in my United States Patent, 2,475,493, issued July 5, 1949.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fall within the scope of the appended claims.

What I claim is:

1. In an antifriction roller bearing the combination of a primary section, an auxiliary section on said primary section, an annular shaft sleeve rotatably mounted on said sections, said primary section provided with spaced posts, said primary and auxiliary sections provided between each two contiguous posts with cup seats, and rollers seated in said cup seats.

2. In an antifriction roller bearing, the combination with a primary section, an auxiliary section on said primary section, said sections provided with sets of cup seats, a cylindrical roller for each set of cup seats, said cylindrical roller having at one end a tit extending into a cup seat and at another end a rounded dome top extending into a cup seat.

3. In an antifriction roller bearing, the combination of a primary section provided with a central opening and with a plurality of space cylindrical fixed posts, said primary section provided between each two contiguous posts with a primary cup seat, an auxiliary section on said primary section and provided with a central opening registering with the central opening of said primary section, screws extending through portions of said auxiliary section and into some of said posts, said auxiliary section provided with auxiliary cup seats registering with the said cup seats of said primary section, rollers seated in said cup seats, and an annular shaft sleeve in said openings of said sections and having reduced portions contacting the sections.

HARRY L. GORDON.

REFERENCES CITED

The following references are of record in the file of this patent:

UNITED STATES PATENTS

| Number | Name | Date |
|---|---|---|
| 1,047,914 | Caresse | Dec. 24, 1912 |

FOREIGN PATENTS

| Number | Country | Date |
|---|---|---|
| 66,918 | Switzerland | Dec. 20, 1913 |